United States Patent [19]

Kamimoto et al.

[11] 4,138,731
[45] Feb. 6, 1979

[54] HIGH SPEED BINARY AND BINARY CODED DECIMAL ADDER

[75] Inventors: Shigemi Kamimoto; Toshio Hayashi, both of Kawasaki; Kazuyuki Shimizu, Machida, all of Japan

[73] Assignee: Fujitsu Limited, Japan

[21] Appl. No.: 859,184

[22] Filed: Dec. 9, 1977

[30] Foreign Application Priority Data

Dec. 30, 1976 [JP] Japan .............................. 51-159210

[51] Int. Cl.$^2$ .............................................. G06F 7/50
[52] U.S. Cl. ...................................... 364/783; 364/787
[58] Field of Search ........................ 364/783, 787, 771

[56] References Cited

U.S. PATENT DOCUMENTS

| 3,711,693 | 1/1973 | Dahl | 364/787 X |
| 3,805,045 | 4/1974 | Larsen | 364/787 |
| 3,925,651 | 12/1975 | Miller | 364/787 X |
| 3,991,307 | 11/1976 | Peddle et al. | 364/783 X |

Primary Examiner—David H. Malzahn
Attorney, Agent, or Firm—Staas & Halsey

[57] ABSTRACT

A high speed binary and binary coded decimal adder which employs a plurality of partial adders and a carry look ahead circuit and is adapted to effect a binary coded decimal addition with only one processing of the adder. The partial adders are each composed of a half adder for generating a bit generate signal and a bit propagate signal, a binary mode carry look ahead input signal generator circuit part, a binary coded decimal mode carry look ahead input signal generator circuit part, an intermediate adder part and a full adder part. The high speed binary and binary coded decimal adder is capable of providing the result of an addition at a speed corresponding to six to seven logical stages.

1 Claim, 18 Drawing Figures

|  | CONTENTS OF AR (16) | CONTENTS OF BR (16) | CONTENTS OF DCR (BINARY) |
|---|---|---|---|
| PROCESS 1 | 3567 | 5781 | 0000 |
| PROCESS 2 | 8CE8 | 5781 | 0000 |
| PROCESS 3 | F34E | 5781 | 0110 |
| PROCESS 4 | 9348 | 5781 | 0000 |

|  | CONTENTS OF AR (16) | CONTENTS OF BR (16) | CONTENTS OF DCR (BINARY) |
|---|---|---|---|
| PROCESS 1 | 3567 | 5781 | 0000 |
| PROCESS 2 | 8CE8 | 5781 | 1111 |
| PROCESS 3 | 8CE8 | 5781 | 0110 |
| PROCESS 4 | 9348 | 5781 | 0000 |

| INPUT | +6 OUTPUT | +10 OUTPUT |
|---|---|---|
| 0000 | 0110 | |
| 0001 | 0111 | |
| 0010 | 1000 | |
| 0011 | 1001 | |
| 0100 | 1010 * | |
| 0101 | 1011 * | |
| 0110 | 1100 | 0000 |
| 1111 | 1101 | 0001 |
| 1000 | 1110 | 0010 |
| 1001 | 1111 | 0011 |
| 1010 | | 0100 * |
| 1011 | | 0101 * |
| 1100 | | 0110 |
| 1101 | | 0111 |
| 1110 | | 1000 |
| 1111 | | 1001 |

|  | CONTENTS OF AR (16) | CONTENTS OF BR (16) | CONTENTS OF DCR (BINARY) |
|---|---|---|---|
| PROCESS 1 | 3567 | 5781 | 0000 |
| PROCESS 2 | 9DE8 | 5781 | 0110 |
| PROCESS 3 | 9348 | 5781 |  |

HIGH SPEED BINARY AND BINARY CODED DECIMAL ADDER

BACKGROUND OF THE INVENTION

1. Field of the Invention

This invention relates to a high speed combination binary and decimal adder which is capable of performing binary and binary coded decimal addition with the same circuit.

2. Description of the Prior Art

In the prior art, a binary coded decimal addition usually requires a plurality of machine cycles because of the processing for the addition and subtraction of correction terms.

Generally, an adder is the nucleus of an arithmetic unit and is related to the data length, the numerical format used, etc. and the computation speed of the adder greatly affects the performance of the arithmetic unit. The numerical format is divided into a fixed-point representation and a floating-point representation, which are subdivided into binary and binary coded decimal representations, respectively.

A combination circuit which is inputted an augend $X_i$, an addend $Y_i$ and a carry $C_{i+1}$ and outputs a sum $Z_i$ and a carry $C_i$ is called a full adder. A circuit which obtains a sum and a carry from two inputs is a half adder.

By preparing the full adder for each digit and successively transferring the carry $C_i$ to higher order digits, a ripple carry adder is provided.

However, the ripple carry adder requires two logical stages for each digit and if the number of digits used is large, the operation time increases correspondingly. If wired logic is possible, one logical stage for each digit will do.

A carry look ahead adder simultaneously produces a carry at each digit and the carry at each digit is essentially determined by all of the bits of the lower order digits, and the fan-in variable increases rapidly.

A decimal number is represented by various methods such as BCD (Binary Coded Decimal), EXCESS 3, 2 out of 5, etc. but, in general, BCD is employed. In the BCD representation, each digit of a decimal number is represented by four bits and they are weighted with 8, 4, 2 and 1 and numerals 0 to 9 are represented as they are on the binary notation.

In general, binary and binary coded decimal adders are provided separately from each other and a binary coded decimal addition is performed by an operation using the binary adder three times.

SUMMARY OF THE INVENTION

An object of this invention is to provide a high speed combination binary and binary coded decimal adder.

Another object of this invention is to provide a combination binary and binary coded decimal adder which is capable of effecting a binary or binary coded decimal addition in one machine cycle.

Still another object of this invention is to provide a combination binary and binary coded decimal adder having a small number of logical stages for performing a high speed operation.

To achieve the abovesaid objects, the adder of this invention employs a plurality of partial adders and a carry look ahead circuit. The plurality of partial adders are composed of a half adder part for producing a bit generate signal and a bit propagate signal, a binary mode carry look ahead input signal generator circuit part for producing a binary mode group generate signal and a binary mode group propagate signal, a binary coded decimal mode carry look ahead input signal generator circuit part for producing a binary coded decimal mode group generate signal and a binary coded decimal mode group propagate signal, an intermediate adder part for effecting a binary or binary coded decimal addition to input data regardless of a carry to provide an intermediate sum, and a full adder part for correcting the intermediate sum from the intermediate adder part with a carry from a carry look ahead circuit.

DESCRIPTION OF THE PREFERRED EMBODIMENTS

A description will be given first of the first to sixth modes of operation of an adder constructed in accordance with this invention.

First Mode

Figures 1, 2:
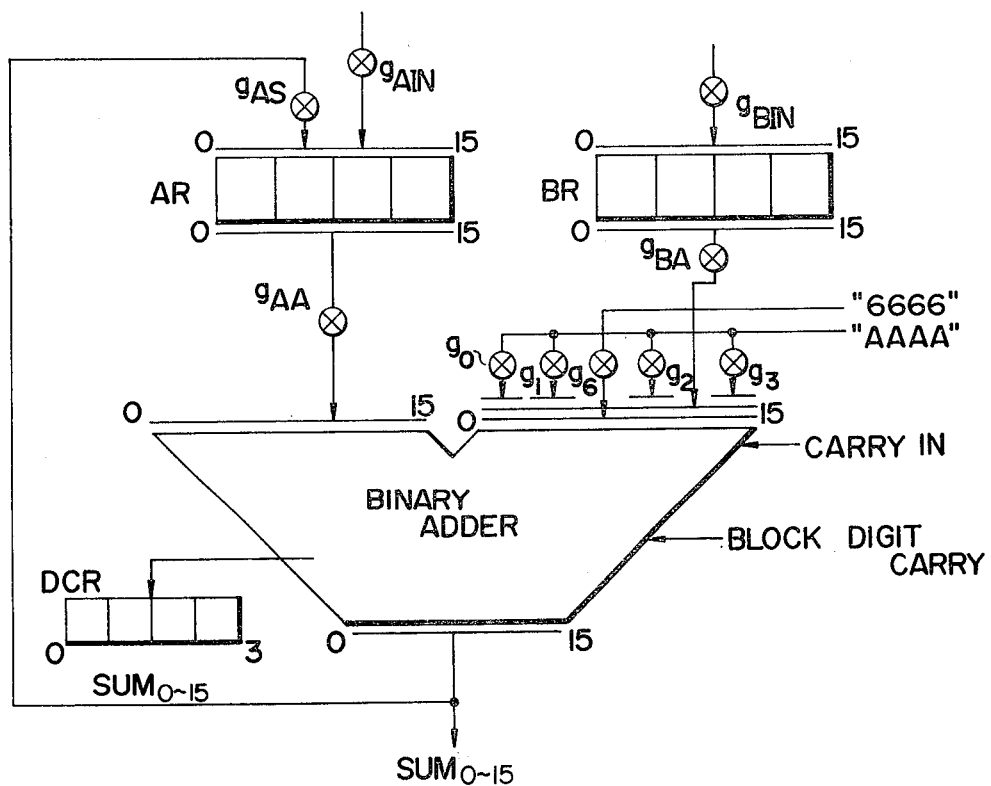
FIG. 1 is a block diagram showing a first example of conventional binary coded adders on which this invention is based.
FIG. 2 is a diagram explanatory of the contents of registers in operation in the decimal adder shown in FIG. 1.

A variety of methods have heretofore been proposed for the addition of binary-coded decimal (BCD) numbers. The most basic method of binary coded decimal addition is to perform an operation using a binary adder three times by the employment of such hardware structure as shown in FIG. 1. An example of the content of each register at the time of completion of each process is shown in FIG. 2. The procedure for the binary coded decimal addition by the hardware is as described in the following processes (1A) to (4A).

(1A) Gates $g_{AIN}$ and $g_{BIN}$ are opened to load an augend and an addend in registers AR and BR, respectively (First process ends).

(2A) Gates $g_{AA}$ and $g_{BA}$ are opened to add together the contents of the registers AR and BR by a binary adder. The result of the addition is loaded in the register AR through a gate $g_{AS}$ (Second process ends).

(3A) The gates $g_{AA}$ and $g_6$ are opened to add the abovesaid result of addition with a number whose digits are all "6". The result of this addition is loaded in the register AR through the $g_{AS}$. Also, the carry output from each digit is loaded in a digit carry register DCR. The number of bits of the register DCR is required to be equal to the number of digits of the data handled (Third process ends).

(4A) Gates $g_0$, $g_1$, $g_2$ and $g_3$ are selectively opened depending on the content of the register DCR so that a numerical value "10" (1010 in the binary notation and A in the hexadecimal notation) is selectively inputted only to those of the digit positions of the register DCR whose bits are "0" idicating that no carries have been applied from the digits of the abovesaid numerical value. On the other hand, the gate $g_{AA}$ is opened to input the result of the addition in the process (3A) to the other of the binary adder. At this time, a block digit carry signal is energized for inhibiting the carry propagation between the digits (Fourth process ends).

With the above operation, "10" can be added (equivalent to the subtraction of "6") selectively for each digit. This operation is referred to as the decimal correction. The output from the binary adder at this time indicates the result of a correct binary coded decimal addition. The adder output is loaded again in the register AR through the gate $g_{AS}$. (This operation is not always required.) The adder output may also be applied to other register or functional part.

A specific operative example of the above procedure will hereinbelow be described. Another example is illustrated by FIG. 2.

Let it be assumed that the augend is "3528" and that the addend is "2691".

In the process (1A),

|      |      |      |      |     |
|------|------|------|------|-----|
| 0011 | 0101 | 0010 | 1000 | and |
| 0010 | 0110 | 1001 | 0001 |     | are set in the registers AR and BR, respectively.

In the process (2A),

|   |      |      |      |      |
|---|------|------|------|------|
|   | 0011 | 0101 | 0010 | 1000 |
| + | 0010 | 0110 | 1001 | 0001 |
|   | 0101 | 1011 | 1011 | 1001 | is set in the register AR.

In the process (3A), "6" is added to each digit

|   |      |      |      |      |
|---|------|------|------|------|
|   | 0101 | 1011 | 1011 | 1001 |
| + | 0110 | 0110 | 0110 | 0110 |
|   | 1100 | 0010 | 0001 | 1111 |
| carry... | 0 | 1 | 1 | 0 | and the sum is set in the register AR and the carry is set in the register DCR.

In the process (4A),

|   |      |      |      |      |
|---|------|------|------|------|
|   | 1100 | 0010 | 0001 | 1111 |
| + | 1010 | 0000 | 0000 | 1010 |
|   | 0110 | 0010 | 0001 | 1001 | is set in the register AR, providing a sum "6219".

Since the method of FIG. 1 uses the binary adder three times, as described above if one addition requires one machine cycle, three machine cycles are needed. Further, this method requires the function of inputting either one of two constants "6" or "A" (hexadecimal) for each digit and the function of inhibiting carry propagating between the digits and means for temporarily storing the carry from each digit. However, after the process 2A, the register BR is not used, so that some of the bits of the register BR can be utilized in place of the register DCR in FIG. 1.

Second Mode

Figures 3, 4:
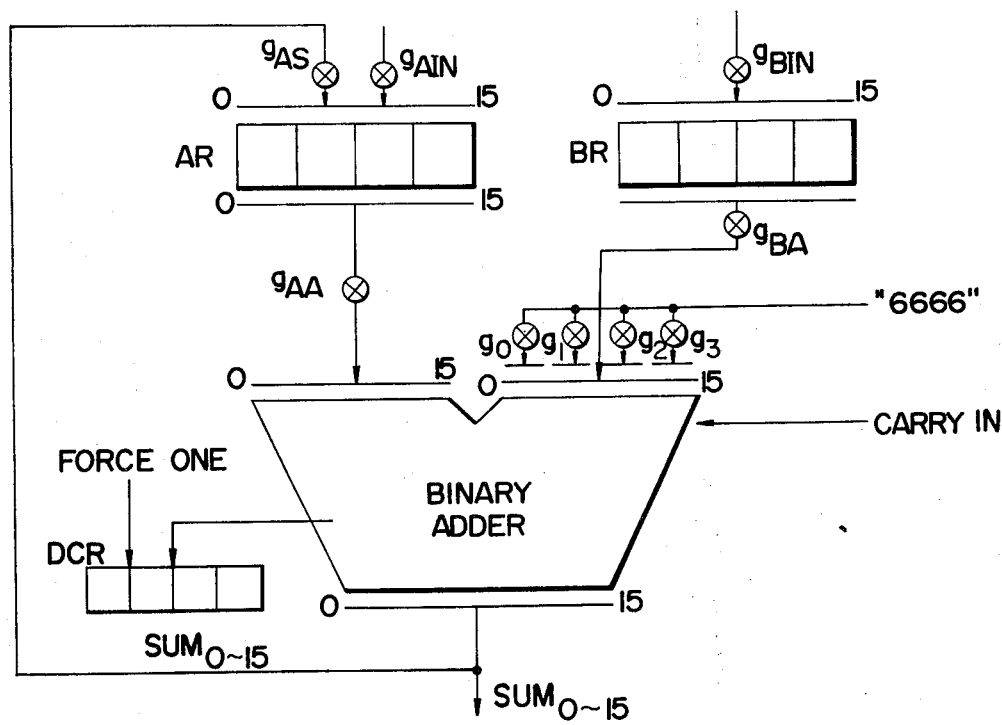
FIG. 3 is a block diagram showing a second example of the conventional binary coded decimal adders on which this invention is based.
FIG. 4 is a diagram explanatory of the contents of registers in operation in the binary coded decimal adder shown in FIG. 3.

Even for the binary coded decimal addition requiring three machine cycles as is the case with the example of FIG. 1, the hardware can be simplified, for instance, as shown in FIG. 3. In FIG. 3, since the function of inputting the constant A to the adder and the function of inhibiting carry propagation between digits are not employed, the amount of hardware used is reduced correspondingly.

The procedure for the binary coded decimal addition using the hardward of FIG. 3 will hereunder be described. An example of the content of each register at the time of completion of each process is shown in FIG. 4.

(1B) The gates $g_{AIN}$ and $g_{BIN}$ are opened to load an augend and an addend in the registers AR and BR, respectively. The register DCR is set at "0" (First process ends).

(2B) The gates $g_{AA}$ and $g_{BA}$ are opened to input the contents of the registers AR and BR to the binary adder for addition. The result of the addition is loaded in the register AR through the gate $g_{AS}$. At the same time, all the bits of the register DCR are set at "1" (Second process ends).

(3B) Since the bits of the register DCR are all "1", the gates $g_0$, $g_1$, $g_2$ and $g_3$ are opened to input the constant "6666" to one part of the adder. On the other hand, the gate $g_{AA}$ is opened to input the result of the addition in the process (2B) to the input side of the adder for addition. The carry from each digit, resulting from this addition, is loaded in the register DCR. The result of the addition (sum) is not used (Third process ends).

(4B) Depending upon the content of the rigister DCR, the gates $g_0$, $g_1$, $g_2$ and $g_3$ are selectively opened to input a numeral "6" only to those of the digit positions of the register DCR in which the bits are "1", that is, the digit positions where the carry outputs were produced in the addition in the process (3B), and a numeral "0" is inputted to the other digit positions. To the other input of the adder, the content of the register AR, that is, the result of the addition in the process (2B), is inputted for addition. The resulting output from the adder is the result of a correct binary coded decimal addition. This result (sum) is transferred to other functional part directly or after loaded in the register AR through the gate $g_{AS}$ (Fourth process ends).

Third Mode

Speeding up of the operation of the system shown in FIG. 3 is possible. That is, the process (3B) is remarkedly different from the process (3A). It is seen that the process (3A) is required to obtain a correct result of the addition for the next process and that the process (3B) is not required to obtain the sum but is required only to indicate the presence or absence of the carry output from each digit. Accordingly, by the provision of a carry look ahead circuit which predicts or looks ahead what would become of the carry output for each digit, that is, the decimal digit carry output, if the numeral "6666" should be inputted in addition to the input to the adder during the addition in the process (2B), the processes (2B) and (3B) can be executed in the same machine cycle. But it is uneconomical to provide the abovesaid carry look ahead circuit for the decimal addition independently of the carry look ahead circuit of the binary counter.

Also in the case of the binary adder, when the data length is large, for example, 4- or 8-byte, the adder is designed to be composed of partial adders, each having a width of 4 or 8 bits, mainly for the purpose of a high-speed operation. In this instance, each partial adder produces from the part of its input a group generate term GG and a group propagate term GP, respectively. The term GG is a signal which depends only upon the input data handled by the partial adder and indicates that a carry input must be applied to the immediately higher order partial adder. The term GP is a signal which indicates the application of the carry input to the higher order partial adder only when a carry input is applied to this partial adder from the lower order one. Assuming that the partial adder is 4-bit, that its one input data are $a_i$, $a_{i+1}$, $a_{i+2}$ and $a_{i+3}$ and that the other input data are $b_i$, $b_{i+1}$, $b_{i+2}$ and $b_{i+3}$, the generate and propagate terms $g_i$ and $p_i$ are defined as follows for each bit;

$$g_i = a_i \cdot b_i \tag{1}$$

$$p_i = a_i + b_i \tag{2}$$

or $$h_i = a_i \forall b_i = a_i \cdot \overline{b_i} + \overline{a_i} \cdot b_i \tag{3}$$

If the terms GG and GP of this partial adder are represented by $GG_i$ and $GP_i$, respectively, they are given by the following equations, in which i = 4n (n = 0, 1, 2, 3)

$$GG_i = g_i + p_i g_{i+1} + p_i p_{i+1} g_{i+2} + p_i p_{i+1} p_{i+2} g_{i+3} \tag{4}$$

$$GG_{i'} = g_i + h_i g_{i+1} + h_i h_{i+1} g_{i+2} + h_i h_{i+1} h_{i+2} g_{i+3} \tag{4'}$$

$$GP_i = p_i p_{i+1} p_{i+2} p_{i+3} \tag{5}$$

$$GP_{i'} = h_i h_{i+1} h_{i+2} h_{i+3} \tag{6}$$

Where each partial adder generates such terms GG and GP, it is necessary to provide a circuit which receives the terms from all of the partial adders to decide the carry input to each of them. This circuit can be designed as an independent part under the name of an external carry circuit, but is is also possible to provide the parts necessary for the partial adders at required positions. In the latter case, however, the terms GG and GP from the lower order partial adders are distributed to many higher order ones, so that complicated wiring is needed. At any rate, the overall circuit for the generation of the terms GG and GP and the decision of the carry input to each partial adder performs the carry look ahead function.

Figure 5:
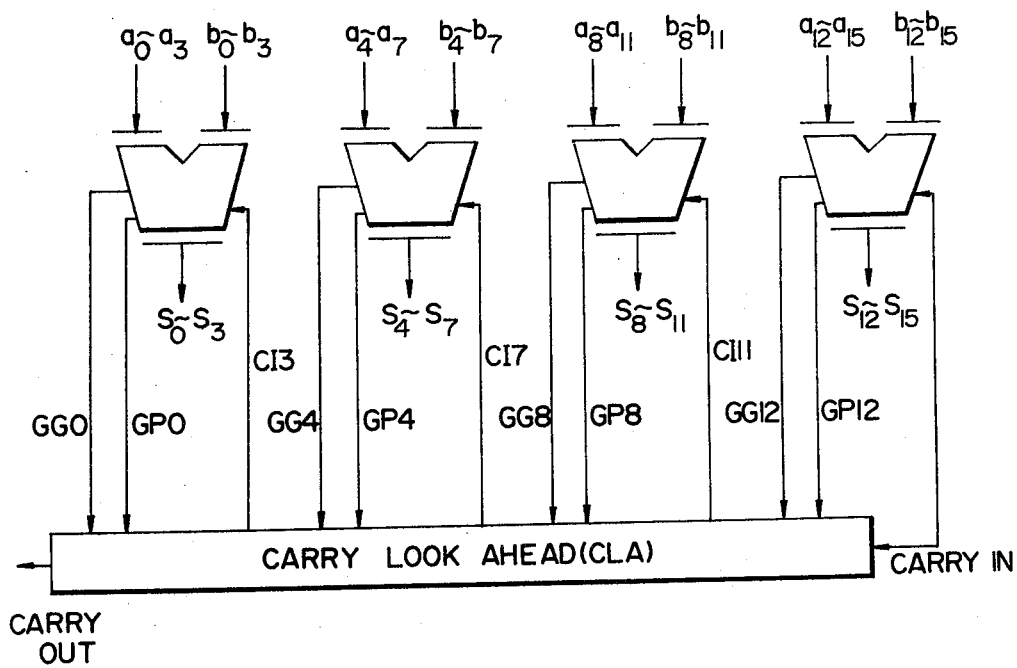
FIG. 5 is a block diagram illustrating a third example of a conventional binary coded decimal adder using a carry look ahead circuit on which this invention is based.

Based on the looked ahead carry input thereto, each partial adder provides a correct sum for the part assigned thereto. FIG. 5 is explanatory of such partial adder and carry look ahead mechanism. In FIG. 5, the partial adder is shown to have a 4-bit width but the width may also be larger or smaller. Also, the adder itself can be formed as a 4- or 8-byte adder by increasing the number of partial adders to increase only the carry look ahead part. In the example of FIG. 5, carry inputs $CI_3$, $CI_7$ and $CI_{11}$ to respective partial adders are equal to carry outputs $\overline{CO}_4$, $\overline{CO}_8$ and $\overline{CO}_{12}$ therefrom, respectively, and are given by the following equations.

$$CI_{11} = C\overline{O}_{12} = GG_{12} + GP_{12} \cdot CARRY\ IN \tag{7}$$

$$\begin{aligned} CI_7 = C\overline{O}_8 &= GG_8 + GP_8 \cdot GG_{12} \\ &\quad + GP_8 \cdot GP_{12} \cdot CARRY\ IN \end{aligned} \tag{8}$$

$$\begin{aligned} CI_3 = C\overline{O}_4 &= GG_4 + GP_4 \cdot GG_8 + GP_4 \cdot GP_5 \cdot GG_{12} \\ &\quad + GP_4 \cdot GP_8 \cdot GP_{12} \cdot CARRY\ IN \end{aligned} \tag{9}$$

$$\begin{aligned} CARRY\ OUT = \\ GG_0 + GP_0 \cdot GG_4 + GP_0 \cdot GP_4 \cdot GG_8 + GP_0 \cdot GP_8 \cdot \\ GG_{12} + GP_0 \cdot GP_4 \cdot GP_8 \cdot GP_{12} \cdot CARRY\ IN \end{aligned} \tag{10}$$

Figure 6:
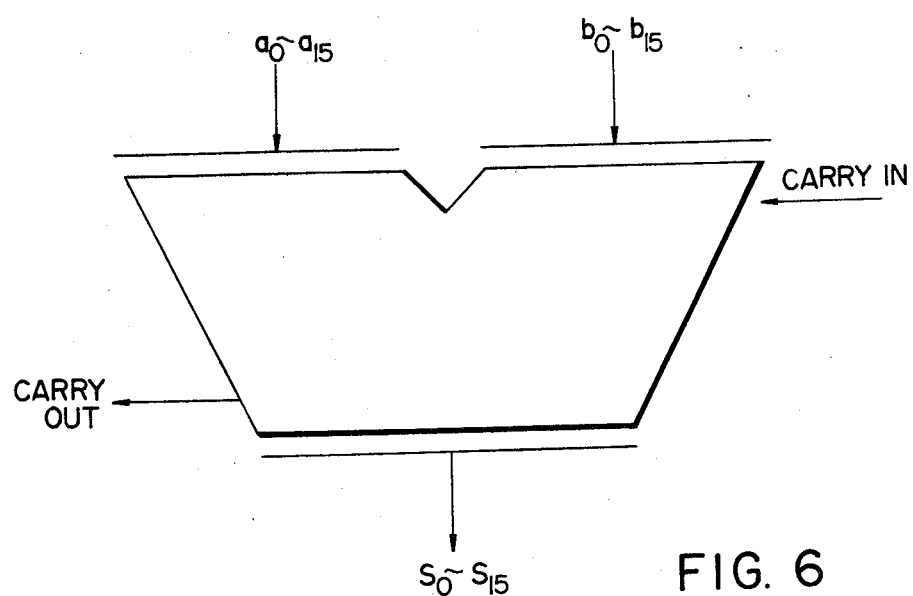
FIG. 6 is a block diagram showing the adder of FIG. 5 in its entirety.

The adder of FIG. 5 is such as depicted in FIG. 6 in its entirety. The above describes that the independent provision of the carry look ahead circuit for he binary coded decimal addition is uneconomical.

Fourth Mode

As described above, the decimal addition using the binary adder requires three machine cycles and, in order to reduce them to two machine cycles, a carry look ahead circuit for decimal addition is needed. If the carry look ahead circuit for decimal addition is provided independently, it is necessary to provide circuits for generating the terms GG and GP for binary coded decimal addition for each partial adder and the carry look ahead circuit shown in FIG. 5. For the carry look ahead operation for binary coded decimal addition, it is indispensable that each partial adder has the functions of generating the terms GG and GP for decimal addition but it is better that the part corresponding to the carry look ahead circuit depicted in FIG. 5 be effectively used for binary coded decimal addition.

Figures 7, 10:
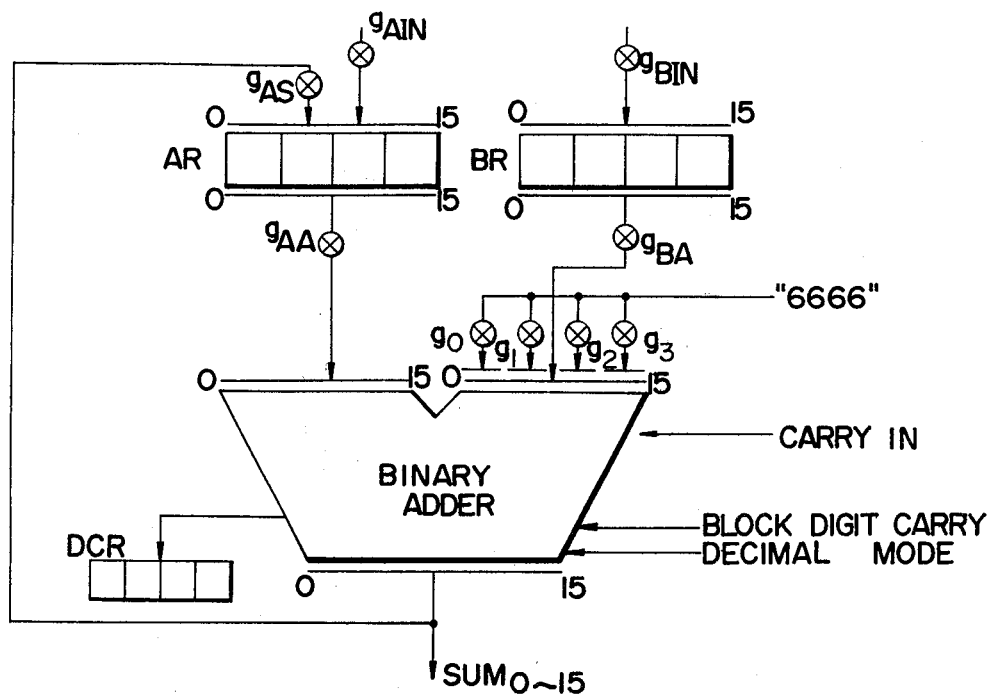
FIG. 7 is a block diagram showing a fourth example of a conventional binary coded decimal adder which executes an addition in two machine cycles and on which this invention is based.
FIG. 10 is a reference diagram explanatory of problems of the adder shown in FIG. 9.
Figures 8, 9:
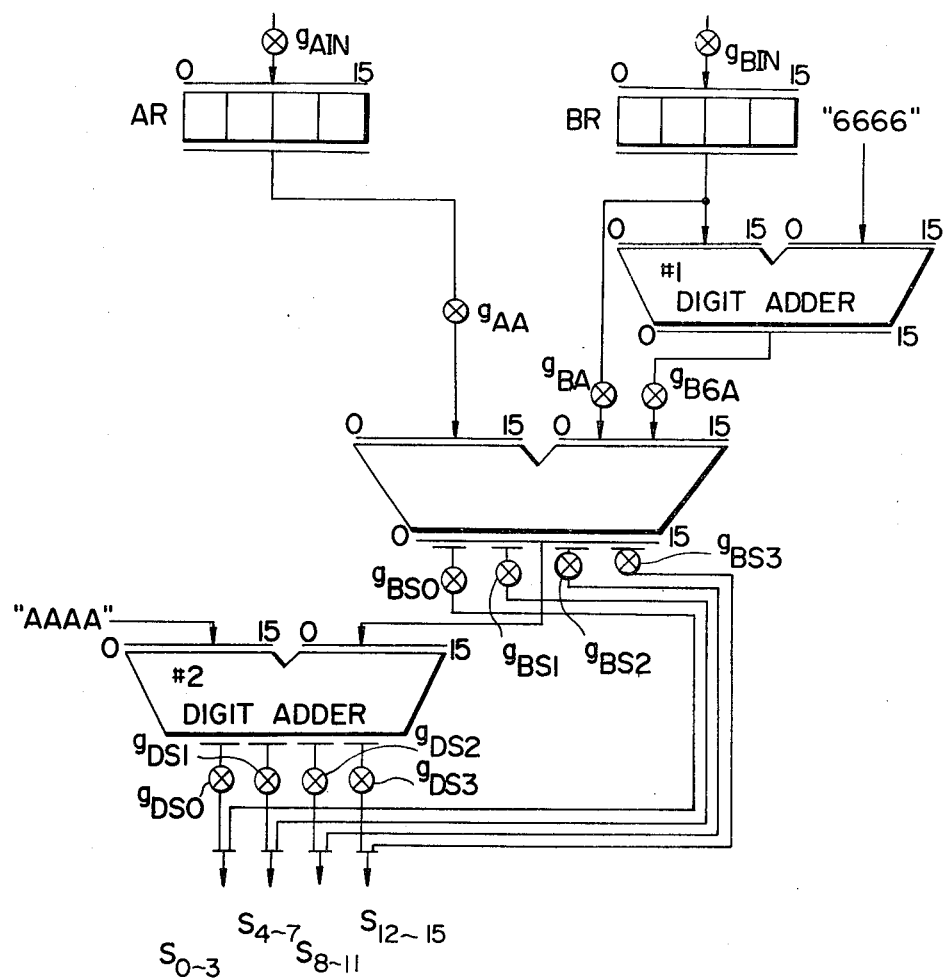
FIG. 8 is a diagram explanatory of the contents of registers in operation in the binary coded decimal adder depicted in FIG. 7.
FIG. 9 is a block diagram illustrating a fifth example of a conventional binary coded decimal adder which executes an addition in one machine cycle.

To this end, a new algorithm for binary coded decimal addition will be described. FIG. 7 shows the structure therefor and the procedure will hereinbelow be explained. An example of the content of each register at the time of completion of processes (1C) to (3C) is shown in FIG. 8.

(1C) The gates $g_{AIN}$ and $g_{BIN}$ are opened to load an augend and an addend in the registers AR and BR, respectively (First process ends).

(2C) The gates $g_{AA}$ and $g_{BA}$ are opened to input the contents of the registers AR and BR to the binary adder for addition. At this time, a decimal mode signal is energized to make the carry propagation for each digit a decimal carry. The addition based on each digit after obtaining the carry input thereto is effected in the hexadecimal notation. This means it sufficient only to obtain the terms $GG_0$ to $GG_{12}$ and $GP_0$ to $GP_{12}$ in the decimal notation. In other words, the term $GG_i$ is "1" when the sum of addition of its $a_i$ to $a_{i+3}$ and $b_i$ to $b_{i+3}$ is "10" or more and the term $GP_i$ is "1" when the sum of addition of $a_i$ to $a_{i+3}$ and $b_i$ to $b_{i+3}$ is "9" or more. At this time, the carry output for each digit is loaded in the register DCR. The sum is loaded in the register AR through the gate $g_{AS}$ (Second process ends).

(3C) The gates $g_0$ to $g_3$ are selectively opened corresponding to those of the digit positions of the register DCR in which the bits are "1", i.e. the digit positions where decimal carry outputs were provided in the addition of the process (2C), and the gate $g_{AA}$ is opened to input the result of the addition in the process (2C) to the binary addition. At this time, a block digit carry signal is energized to perform an addition in each digit, inhibiting the carry propagation. This provides a correct result of the decimal addition and the output from the binary adder is loaded in the register AR through the gate $g_{AS}$ or transferred directly to other functional part (Third process ends).

Now, the method of forming the decimal carry in the process (2C) will be discussed in a little more detail. The decimal number now considered is a binary-coded decimal number and four bits of the binary notation forms one digit of the decimal number. Accordingly, the magnitude (data width) of each of the partial adders making up the binary adder is such that a magnitude of 4 bits is the fundamental magnitude, and it is natural that its extended type is an integral multiple of four bits. Therefore, let it be assumed that the adder of FIG. 7 is composed of four 4-bit partial adders as depicted in FIG. 5. The terms GG and GP in the 4-bit binary partial adder are expressed by the equations (4) and (5), respectively. In this case, $G_i$ is "1" when the sum of addition of $a_i$ to $a_{i+3}$ with $b_i$ to $b_{i+3}$ is "16" or more, while $GP_i$ is "1" when the abovesaid sum is "15" or more. $GP_i$ becomes "1" only when the sum is "15" but, when obtaining each carry from the equations (7) to (10), the same result is obtained regardless of whether $GP_i$ or $GP_i$, is used. The terms GG and GP to be generated by each partial adder for the abovesaid process (2C) are for the binary coded decimal addition, and hence will be identified as DGG and DGP in distinction from the abovesaid terms GG and GP, respectively. Since $DGG_i$ is required to be "1" when the sum of addition of $a_i$ to $a_{i+3}$ with $b_i$ to $b_{i+3}$ is "10" or more, it becomes as follows.

$$DGG_i = g_i + p_i(p_{i+1} + p_{i+2} + g_{i+3}) \\ + g_{i+1} \cdot (p_{i+2} + g_{i+3}) + p_{i+1} \cdot g_{i+2} \cdot g_i \quad (11)$$

or $$DGG_i' + g_i + h_i \cdot h_{i+1} + h_i \cdot g_{i+1} + h_i \cdot g_i \\ + h_i \cdot h_{i+2} + h_i \cdot g_{i+3} + g_{i+1} \cdot h_{i+2} \\ + 2 + g_{i+1} \cdot g_{i+2} + g_{i+1} \cdot g_{i+3} + h_i + 1 \cdot g_{i+2} \cdot g_{i+3} \quad (12)$$

In the equation (12), the third and fourth terms do not exist in the case of a BCD input, so that if they are omitted, the following equation is obtained.

$$DGG_i' = g_i + h_i(h_{i+1} + h_{i+2} + g_{i+3}) \\ + g_{i+1} \cdot (h_{i+2} + g_{i+2} + g_{i+3}) + h_{i+1} \cdot g_{i+2} \cdot g_{i+3} \quad (12')$$

Further, $DGP_i$ is required to be "1" when the sum of addition of $a_i$ to $a_{i+3}$ with $b_i$ to $b_{i+3}$ is "9" or more and the term more than "9" is not always required to include, so that $DGP_i$ can be obtained by the following equation.

$$DGP_i = (p_i + g_{i+1} + p_{i+1} \cdot g_{i+2}) \cdot p_{i+3} \quad (13)$$

or $$DGP_i' = (h_i + g_{i+1} + h_{i+1} \cdot g_{i+2}) \cdot h_{i+3} \quad (14)$$

The terms GG and GP given by the equations (12') and (14), respectively, are sufficient to be generated only in binary coded the decimal mode of operation and it is necessary to provide the values of the equations (4) to (6) in other modes than the binary coded decimal mode of operation. Since the terms GG and GP of the equations (4) to (6) are for the binary operation, they will be identified as BGG and BGP, respectively. The terms GG and GP to be outputted from each partial adder are given by the following equations.

$$GG_i = BGG_i(\overline{DECIMAL\ MODE}) + DGG_i \\ (DECIMAL\ MODE) \quad (15)$$

$$GP_i = BGP_i(\overline{DECIMAL\ MODE}) + DGP_i \\ (DECIMAL\ MODE) \quad (16)$$

Since all the terms of $BGG_i$ and $BGP_i$ may be included in the binary coded decimal mode of operation, they may be given by the following equations.

$$GG_i = BGG_i + DGG_i(DECIMAL\ MODE) \quad (15')$$

$$GP_i = BGP_i + DGP_i(DECIMAL\ MODE) \quad (16')$$

Described in detail in connection with the case where the terms GG and GP are represented by terms g and k, respectively, the equations (15') and (16') become as follows.

$$GG_i = g_i + h_i \cdot g_{i+1} + h_i \cdot h_{i+1} \cdot g_{i+2} \\ + h_i \cdot h_{i+1} \cdot h_{i+2} \cdot g_{i+3} \\ + \{h_i(h_{i+1} + h_{i+2} + g_{i+3}) + g_{i+1} \cdot h_{i+2} + g_{i+1} \cdot \\ (g_{i+2} + g_{i+3}) + h_{i+1} \cdot g_{i+2} \cdot g_{i+3})\}(DECIMAL\ MODE) \quad (17)$$

$$GP_i = h_i \cdot h_{i+1} \cdot h_{i+2} \cdot h_{i+3} \\ + (h_i + g_{i+1} + h_{i+1} \cdot g_{i+2}) \cdot h_{i+3} \cdot (DECIMAL\ MODE) \quad (18)$$

As is seen from the above, the decimal addition can be achieved in two machine cycles by providing, as additional hardware for the binary coded decimal addition in the process (2C), gates (roughly estimated, ten AND gates per digit) for generating the terms for DECIMAL MODE in the equations (17) and (18), means for storing the carry from each digit (for example, latches equal in number to the digits), means for selectively inputting the numeral "6(0110)" to each digit and means for inhibiting carry propagation between the digits in the process (3C).

Fifth Mode

Now, a discussion will be made with regard to a method of effecting a binary coded decimal addition in one machine cycle, correctly speaking, a method of binary coded decimal addition using the main adder part only once. The most basic system is such as shown in FIG. 9.

In the case of achieving an addition of binary numbers by the employment of the adder of FIG. 9, the gates $g_{AIN}$ and $g_{BIN}$ are opened to load an augend and an addend in the registers AR and BR, respectively, and the gates $g_{AA}$ and $g_{BA}$ are opened to input the contents of the registers AR and BR to the binary adder for addition. The output from the adder is derived therefrom through gates $g_{BS0}$ to $g_{BS3}$ to obtain sums $SUM_0$ to $SUM_{15}$.

The addition of decimal (BCD) numbers by the adder of FIG. 9 follows the following processes.

(1D) The gates $g_{AIN}$ and $g_{BIN}$ are opened to load an augend and an addend in the registers AR and BR, respectively.

(2D) "6" is added by a #1 digit adder to the content of the register BR for each digit. At this time, there is no need of carry propagation between the digits, so that #1 digit adder can be formed with one logical stage.

(3D) The gate $g_{AA}$ and $g_{B6A}$ are opened to input the sums of the contents of the registers AR and BR and "6666" to the binary adder for addition.

(4D) "10 (1010)" is added by a #2 digit adder to each digit of the result (sum) of the addition in the process (3D). Also in this addition, no carry propagation between the digits is required, so that the #2 digit adder can also be formed with one logical stage.

(5D) Gates $g_{DS0}$ to $g_{DS3}$ of the digits corresponding to those of the digit positions which did not produce any carry output in the addition of the process (3D) are opened to select the output from the #2 digit adder and gates $g_{BS0}$ to $g_{BS3}$ of the digits corresponding to the digit positions which produced the carry outputs are opened to select the output from the binary adder. Both outputs are added together to provide the result of the decimal addition $SUM_0$ to $SUM_{15}$.

However, the abovesaid system has a difficulty in such a point as described later, in particular, a problem of obtaining the sum of parity bits.

To further the understanding of the operation of the #1 digit adder and #2 digit adder illustration in FIG. 9, the following description is provided.

FIG. 10 shows the results of additions of "6" and "10" to inputs of one digit. In FIG. 10, * indicates the positions where the parity for the digit is inverted in the input and output. The outputs from the #1 digit adder for the addition of "6" are not shown in connection with inputs "10" or greater (1010 to 1111) since the 1-digit inputs are BCD inputs from 0 to 9. In connection with the addition of "10", the gates $g_{DS0}$ to $g_{DS3}$ are not opened, so that no outputs are produced.

Since the parity bit is usually provided for each byte (every eight bits), input data $b_0$, $b_1$ to $b_7$ of one byte and a parity bit $b_p$ will be considered. Letting the result of the addition of "6" be represented by $b_0'$, $b_1'$ to $b_7'$ and $b_p'$, they are as follows. (The input is assumed to be a BCD input).

$$b_0' = b_0 + b_1 + b_2 \tag{19}$$

$$b_1' = b_1 \,\forall\, b_2 \tag{20}$$

$$b_2' = \overline{b_2} \tag{21}$$

$$b_3' = b_3 \tag{22}$$

$$P_{INVT\,0\text{-}3}' = b_1 \cdot \overline{b_2} \tag{23}$$

$$b_4' = b_4 + b_5 + b_6 \tag{24}$$

$$b_5' = b_5 \,\forall\, b_6 \tag{25}$$

$$b_6' = \overline{b_6} \tag{26}$$

$$b_7' = b_7 \tag{27}$$

$$P_{INVT\,4\text{-}7}' = b_5 \cdot \overline{b_6} \tag{28}$$

$$b_p' = b_p \,\forall\, P_{INVT\,0\text{-}3}' \,\forall\, P_{INVT\,4\text{-}7}' = b_p \,\forall\, (b_1 \cdot \overline{b_2}) \,\forall\, (b_5 \cdot \overline{b_6}) \tag{29}$$

Next, letting the result of the addition of "10" be represented by $b_0''$, $b_1''$ to $b_7''$ and $b_p''$, they are expressed by the equations stated below. When no output is provided from the #2 digit adder from "0" to "9", the result of the addition of "10" is not used, as described above, so that only 0110 to 1111 are considered as input data. The other input patterns may be included as redundancies.

$$b_0'' = b_0 \cdot b_1 \cdot b_2 \tag{30}$$

$$b_1'' = b_1 \,\forall\, b_2 \tag{31}$$

$$b_2'' = \overline{b_2} \tag{32}$$

$$b_3'' = b_3 \tag{33}$$

$$P_{INVT\,0\text{-}3} = \overline{b_1} \cdot b_3 \tag{34}$$

$$b_4'' = b_4 \cdot b_5 \cdot b_6 \tag{35}$$

$$b_5'' = b_5 \,\forall\, b_6 \tag{36}$$

$$b_6'' = \overline{b_6} \tag{37}$$

$$b_7'' = b_7 \tag{38}$$

$$P_{INVT\,4\text{-}7} = \overline{b_5} \cdot b_6 \tag{39}$$

$$b_p'' = b_p \,\forall\, P_{INVT\,0\text{-}3}'' \,\forall\, P_{INVT\,4\text{-}7}'' = b_p \,\forall\, (b_1 \cdot \overline{b_2}) \,\forall\, (b_5 \cdot \overline{b_6}) \tag{40}$$

As is evident from the above equations (19) to (20), it is easy to form each sum part of the digit adder with one logical stage by the use of an AND gate and an EOR (Exclusive OR) gate. However, a large number of gates are required for forming the logic for obtaining the parity of the sum, i.e. the equations (29) and (40), with one logical stage. For example, the expansion of the equation (40) leads to the equation (41) described later, so that even if the outputs from AND gates are OR'ed with each other by a wired OR, nine AND gates are needed. In addition, both positive and negative inputs are required. Accordingly, the parity is usually predicted after obtaining the terms $P_{INVT\,0\text{-}3}$ and $P_{INVT\,4\text{-}7}$. This decreases the number of gates used but at least two logical stages are necessary for obtaining the parity.

$$b_p'' = b_p \cdot (\overline{b_1} \cdot b_2 \cdot \overline{b_5} \cdot b_6 + b_1 \cdot b_5 + b_1 \cdot \overline{b_6} + \overline{b_2} \cdot b_5 + \overline{b_2} \cdot b_6) + b_p \cdot (\overline{b_1} \cdot b_2 \cdot b_5 + \overline{b_1} \cdot b_2 \cdot \overline{b_6} + b_1 \cdot \overline{b_5} \cdot b_6 + \overline{b_2} \cdot \overline{b_5} \cdot b_6) \tag{41}$$

With the adder of FIG. 9, the binary coded decimal addition can be effected in one machine cycle but since the #1 digit adder and the #2 digit adder are required before and after the binary adder, there is the possibility of prolonging one machine cycle.

Sixth Mode

An example of a higher speed decimal adder is disclosed in IEEE transactions on Computers, Vol. C-20, No. 8, August 1971. The adder set forth in this literature is a high speed decimal adder of a 4-byte width (8 digits) used in IBM system 360/model 195, and six logical stages are used. The binary coded decimal adder disclosed in the abovesaid literature can be considered to be composed of four 1-byte partial adders, i.e. four 2-digit partial adders. Two digits in each partial adder are considered divided into three high order bits and one lower order bit and they define a signal K term which is "1" when the sum of the three higher order bits is "10 or more, and a signal L term which is "1" when the abovesaid sum is "8" or more. With $i = 8 \cdot n$ ($n = 0, 1, 2, 3$), $K_i$, $K_{i+4}$, $L_i$ and $L_{i+4}$ are expressed by the following equations (42) to (45), respectively.

$$K_i = g_i + P_i P_{i+1} + P_i P_{i+2} + g_{i+1} P_{i+2} \quad (42)$$

$$K_{i+4} = g_{i+4} + P_{i+4} P_{i+5} + P_{i+4} P_{i+6} + g_{i+5} P_{i+7} \quad (43)$$

$$L_i = P_i + g_{i+1} + P_{i+1} g_{i+2} \quad (44)$$

$$L_{i+4} = P_{i+4} + g_{i+5} + P_{i+5} g_{i+7} \quad (45)$$

From the terms K and L thus intermediately produced, a group generate term GG and a group propagate term GP of each partial adder as a whole are generated and supplied to the higher order partial adder. They are expressed by the following equations.

$$GG_i = K_i + L_i g_{i+3} + L_i P_{i+3} \cdot K_{i+4} + L_i P_{i+3} \cdot L_{i+4} g_7 \quad (46)$$

$$GP_i = L_i P_{i+3} \cdot L_{i+4} \cdot P_{i+7} \quad (47)$$

The partial adder supplied with the terms GG and GP from the lower order partial adder forms a carry output from the least significant bit of each digit, that is, a carry input to each of the three high order bits, based on the received terms GG and GP and the terms K and L and terms $g_{i+3} \cdot P_{i+3}$, $g_{i+7}$ and $p_{i+7}$ of the partial adder itself, and a sum is provided based on the carry signal and the terms K and L and terms g and p for each bit.

With such a structure, the width of the adder is small and when the number of partial adders used is small, the abovesaid carry configuration is easy but when many partial adders are used, such a carry configuration becomes complex. Now, carry outputs $\overline{CO}_3$ and $\overline{CO}_7$ from the least significant bits of digits at the most significant digit and the next digit are such that:

$$\overline{CO}_3 = g_3 + P_3 \cdot K_4 + P_3 \cdot L_4 \cdot g_7 + P_3 \cdot L_4 \cdot P_7 (GG_8 + GP_8 \cdot GG_{16} + GP_8 \cdot GP_{16} \cdot GG_{24}) \quad (48)$$

$$\overline{CO}_7 = g_7 + p_7 (GG_8 + GP_8 \cdot GG_{16} + GP_8 \cdot GP_{16} \cdot GG_{24}) \quad (49)$$

Generally, hardware of one partial adder is designed as logic on one printed circuit board, one LSI or one area on a super-LSI and it is desirable that all partial adders have exactly the same logical and physical configurations. For example, when one LSI has the function of 1-byte partial adder, a 4-byte adder can be formed with four identical LSI's and there is no need of redesigning four different LSI's.

However, where a circuit for generating the carry outputs indicated by the abovesaid equations (48) and (49) is incorporated in LSI's of partial adders, input pins and internal gates which are not practically used are included in the LSI's for low order bytes, which is uneconomical. As the number of partial adders used increases, the number of input pins and gates for the carry generator circuit becomes enormous and the number of unused input pins and gates in the lower order partial adders increase correspondingly. In practice, a supersized computer often has a binary adder of a 8-byte width and if the 8-byte binary adder is used as a binary coded decimal adder, too, the abovesaid carry circuit is wasted. Further, where the number of terms for producing the carry increases, it is difficult to fabricate the system of the adder disclosed in the aforesaid literature where the logical stages are all formed with six stages. In general, in the case of an increased number of partial adders, for example, when forming one high speed adder with eight or sixteen partial adders, such a configuration as shown FIG. 5 is inevitably required. That is, it is required that the adder is composed of partial adders, each having a circuit for generating the terms GG and GP for the input allotted to the partial adder, and a carry look ahead circuit receiving the terms GG and GP from all of the partial adders to provide a carry input to each of them. With this method, a high speed combination binary and binary coded decimal adder can be formed with six logical stages even in the case of sixteen partial adders being used. It is possible to employ such a hardware configuration as shown in FIG. 5 for the system set forth in the aforesaid literature which has logical stages, that is, three logical stages for generating the terms GG and GP from the input data in each partial adder, two logical stages for forming carry inputs to the sixteen partial adders in the carry look ahead circuit and one logical stage for each partial adder to obtain the carry input from the carry look ahead circuit to output the result of the total addition. For a high speed operation, however, it is necessary that each partial adder receives from the carry look ahead circuit the carry input signal of the least significant bit of the partial adder and the carry output signal from the least significant bit of each digit included in the partial adder. To this end, the carry look ahead circuit is required to receive the terms g and p of the least significant bit of each digit as well as the terms GG and GP from the partial adders. This increases the number of lines for signal transmission and reception between the partial adders and the carry look ahead circuit, and introduces complexity in the carry forming logic in the carry look ahead circuit. Where the number of partial adders used is eight or more, it is difficult to provide logic with two logical stages.

This invention is premised on the above modes and employs the structure shown in FIG. 5, and the partial adder of FIG. 5 is constructed as described hereinunder.

Figure 11:
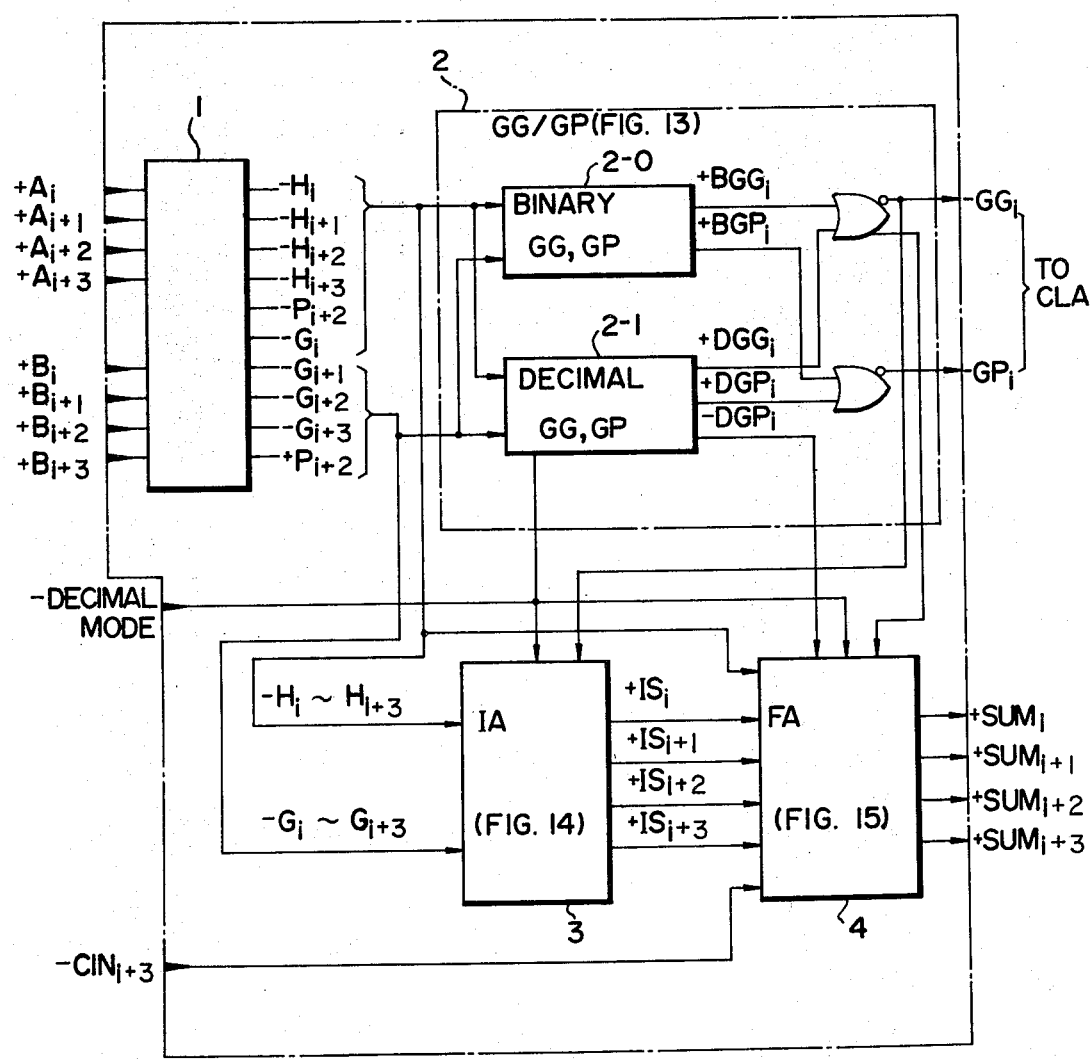
FIG. 11 is a block diagram illustrating an embodiment of a partial adder for use in this invention.
Figure 12:
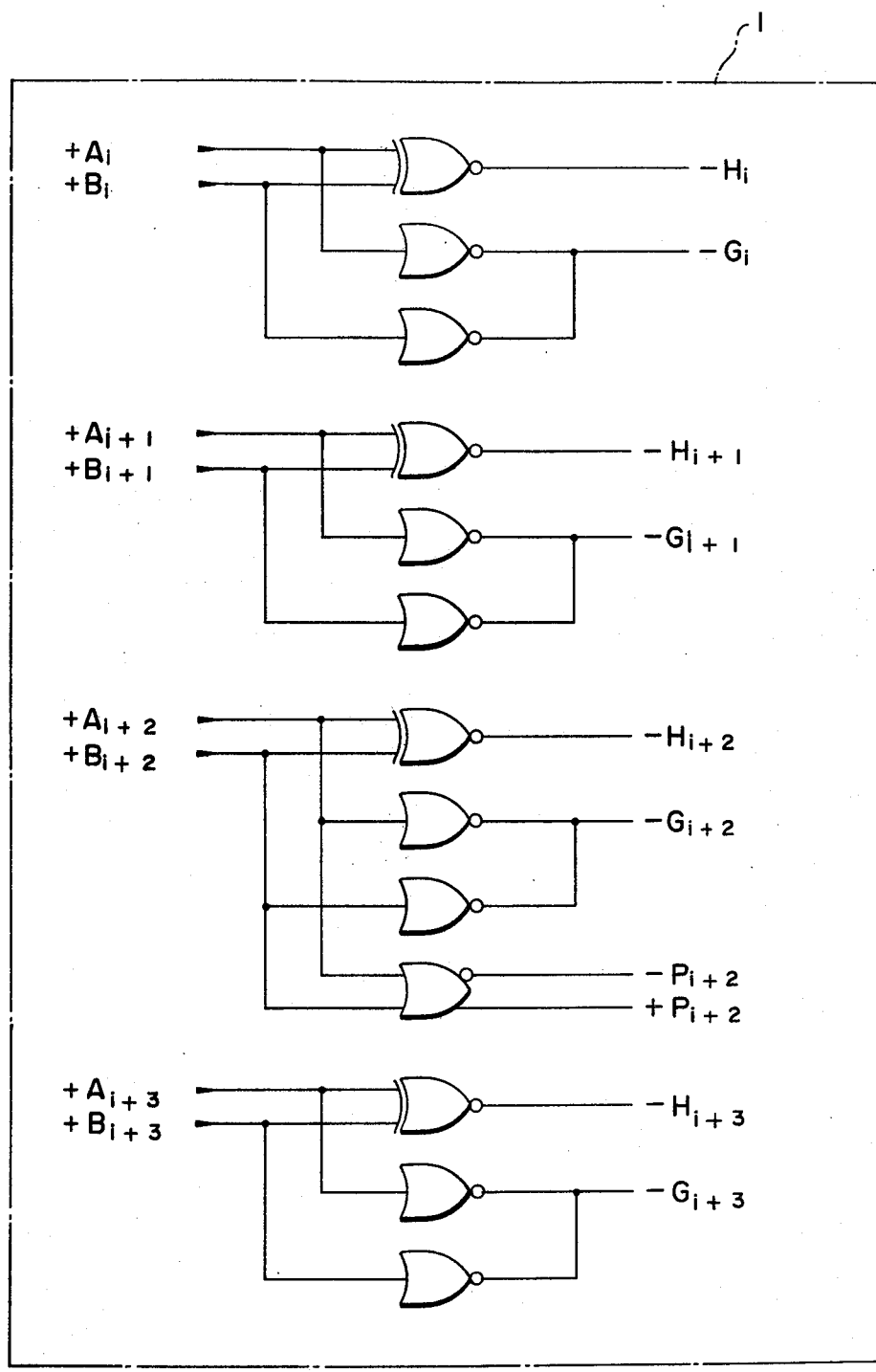
FIG. 12 is a block diagram showing an embodiment of a half adder used in the embodiment of FIG. 11.
Figure 13:
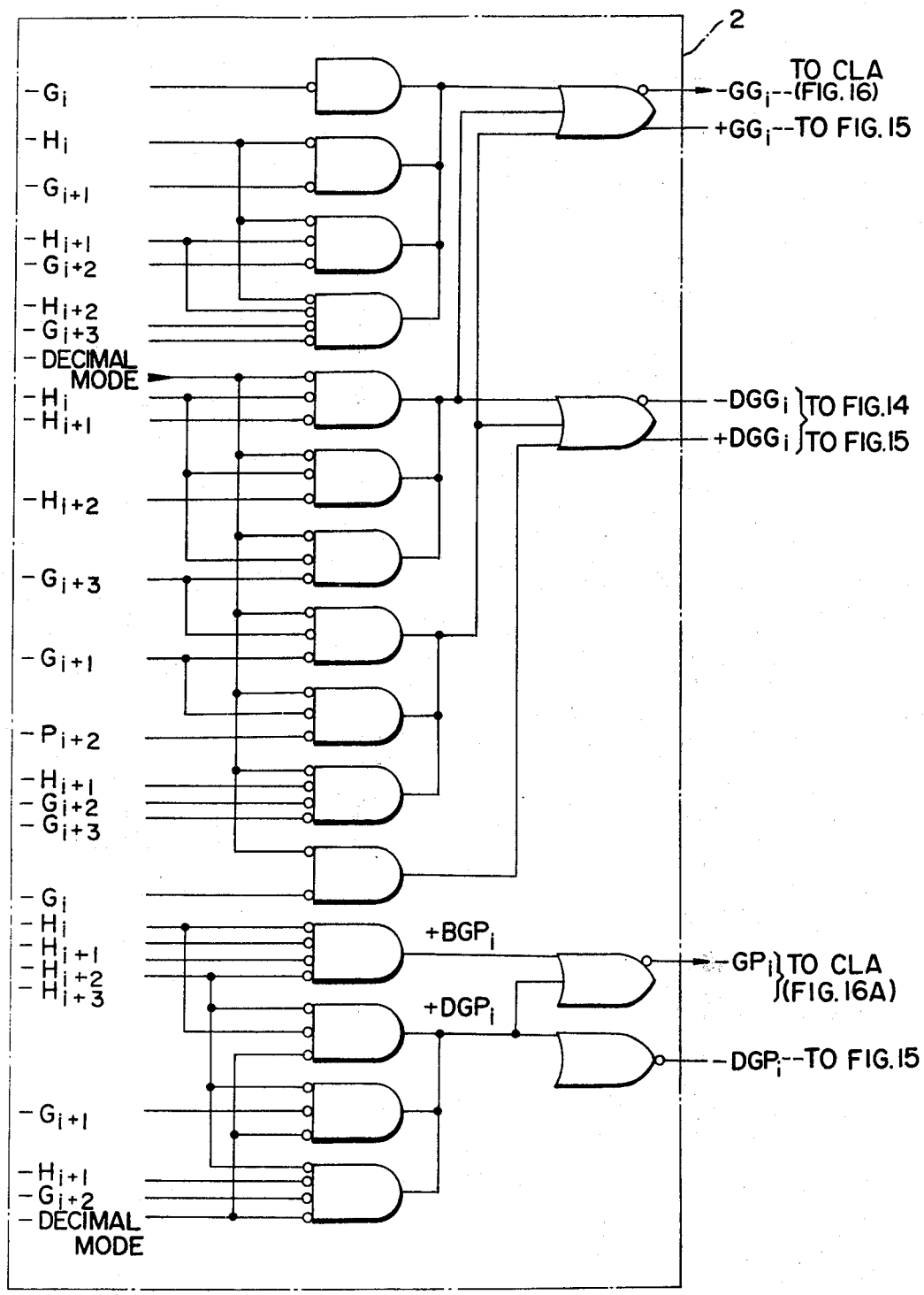
FIG. 13 is a diagram illustrating the construction of an embodiment of a carry look ahead input signal generator circuit part utilized in the embodiment of FIG. 11.
Figure 14:
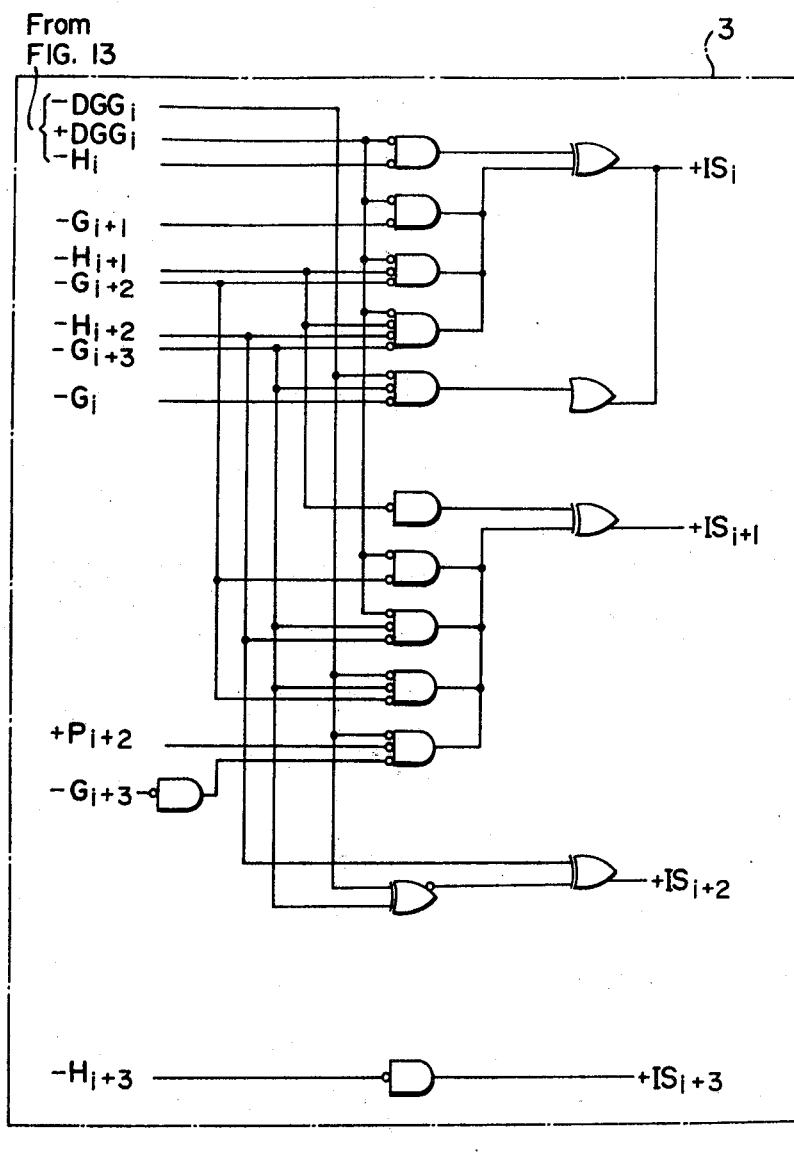
FIG. 14 is a diagram illustrating the construction of an embodiment of an intermediate adder part used in the embodiment of FIG. 11.
Figure 15:
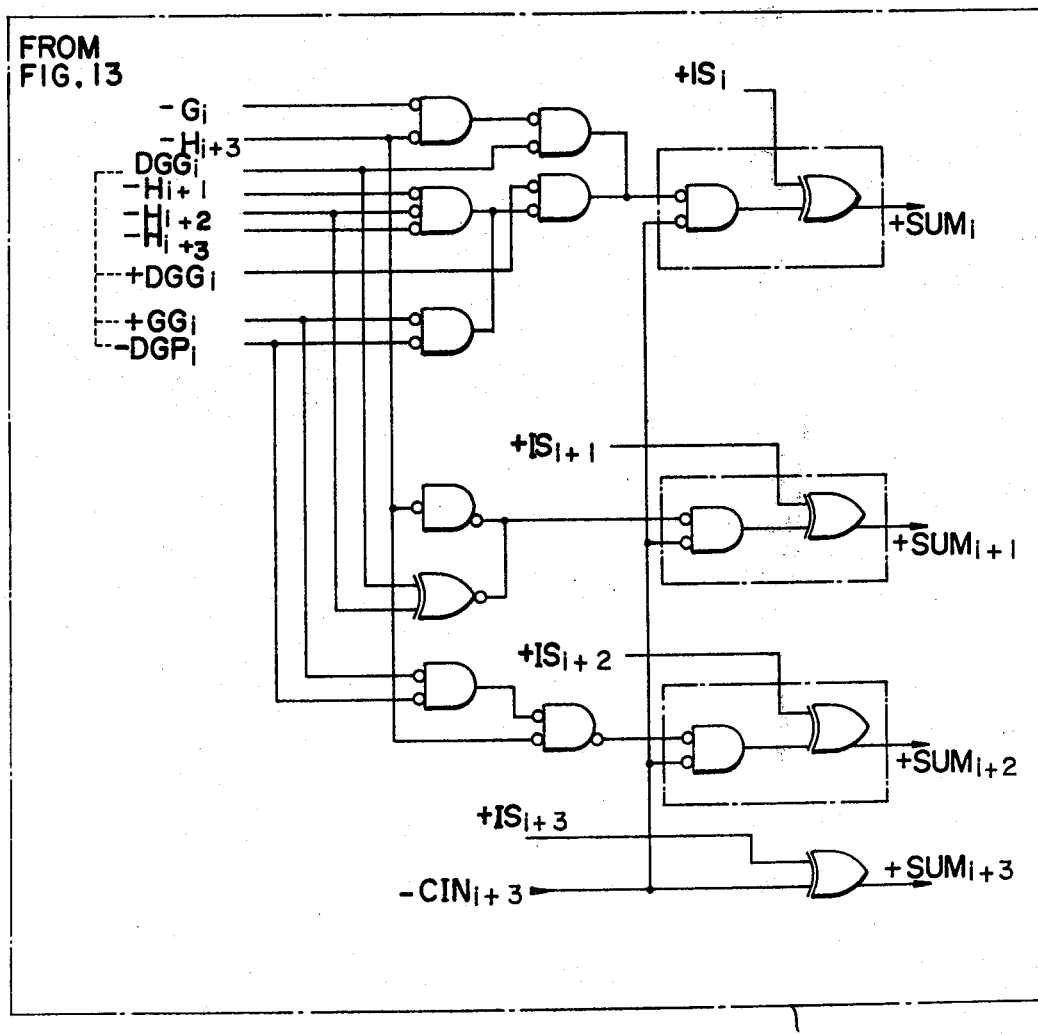
FIG. 15 is a diagram showing the construction of a full adder part used in the embodiment of FIG. 11.

FIG. 11 illustrates the overall structure of an embodiment of the partial adder for use in this invention. In FIG. 11, reference numeral 1 indicates a half adder element; 2 designates a carry look ahead input signal generator circuit element; 2-0 identifies a binary mode carry look ahead input signal generator circuit element; 2-1 denotes a binary coded decimal mode carry look ahead input signal generator circuit element; 3 represents an intermediate adder element; and 4 shows a full adder element. Reference characters $A_i$, $A_{i+1}$ ... $B_i$, $B_{i+1}$ ... refer to bits of an addend and an augent inputted to the partial adder, these bits corresponding to the aforementioned $a_i$ and $b_i$; $BGG_i$ and $BGP_i$ indicate those corresponding to $GG_i$ and $GP_i$ in the aforesaid binary mode of operation, respectively; $DGG_i$ and $DGP_i$ designate those corresponding to $GG_i$ and $GP_i$ in the abovesaid binary coded decimal mode; $IS_i$ corresponds to the intermediate sum, which is outputted from a logical circuit depicted in FIG. 14; $SUM_i$ identifies the final result of addition; and $CIN_i$ denotes a carry input.

in FIG. 11, the bit generate term g and the bit propagate term k are used. (In this case, for simplification of the circuit structure, the term P is used in part.) Needless to say, the terms g and p can be used.

The half adder part 1 generates the terms g and k in accordance with the equations (1) and (2). The binary mode carry look ahead input signal generator circuit element 2-0 forms the terms GG and GP in the binary mode (that is, the terms BGG and BGP) based on the equations (4') and (6). The binary coded decimal mode carry look ahead input signal generator circuit element 2-1 generates the term GG and GP in the binary codes decimal mode (that is, the terms DGG and DGP) based on the equations (12') and (14). Where only one digit, that is, only one binary coded decimal number, is inputted to the partial adder shown in FIG. 11, the abovesaid circuit parts 2-0 and 2-1 supply their generated terms GG and GP to a carry look ahead circuit (CLA). When a plurality of digits are inputted to the partial adder, extended group generate and propagate terms XG and XP covering the input digits are generated and supplied to the carry look ahead circuit. The terms XG and XP are given as follows:

$$XG_i = GG_i + GP_i \cdot GG_{i+4} + GP_i \cdot GP_{i+4} \cdot GG_{i+8} + \quad (50)$$

$$XP_i = GP_i \cdot GP_{i+4} \cdot GP_{i+8} \quad (51)$$

The abovesaid intermediate adder element 3 performs the following processing. That is, the intermediate adder element 3 is supplied with at least the abovesaid terms g and k and the term GG to effect an intermediate sum producing process of a partial adder which achieves an addition of input data to a partial adder unrelated to a carry input from the lower order partial adder depending on whether the operation mode is the binary coded decimal addition mode or not. In other words, in the binary mode, the intermediate adder part 3 outputs a sum of a binary addition of a set of input data applied thereto and, in the binary coded decimal mode, outputs the sum that "6(0110)" is further added to only those digits in which the term GG is "1". The full adder element 4 provides a full addition output after correcting the intermediate sum from the aforesaid intermediate adder element part 3 with a carry input supplied to the least significant bit position of the partial adder from the carry look ahead circuit. That is, a final sum is outputted from the full adder element 4. Though not shown in FIG. 11, the overall structure of the adder circuit of this invention is the same as that depicted in FIG. 5. Each term applied to the carry look ahead circuit (CLA), not shown, is used in common with both the binary and binary coded decimal modes and the hardware of the carry look ahead circuit (see FIG. 16) is used in common with both the binary and binary coded decimal modes.

Figure 16A:
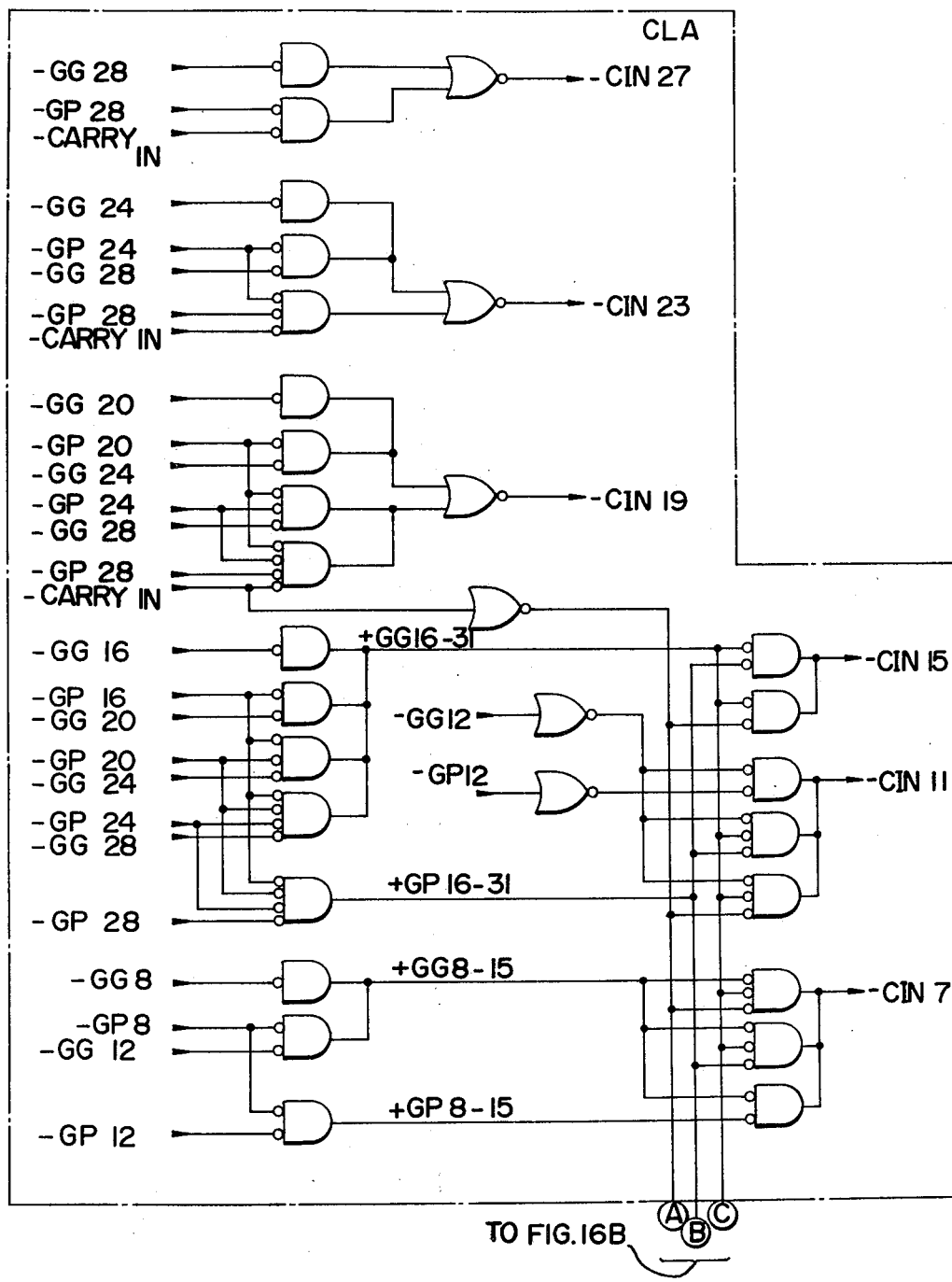
FIGS. 16A and 16B are diagrams showing an embodiment of a carry look ahead circuit for use in this invention.
Figure 16B:
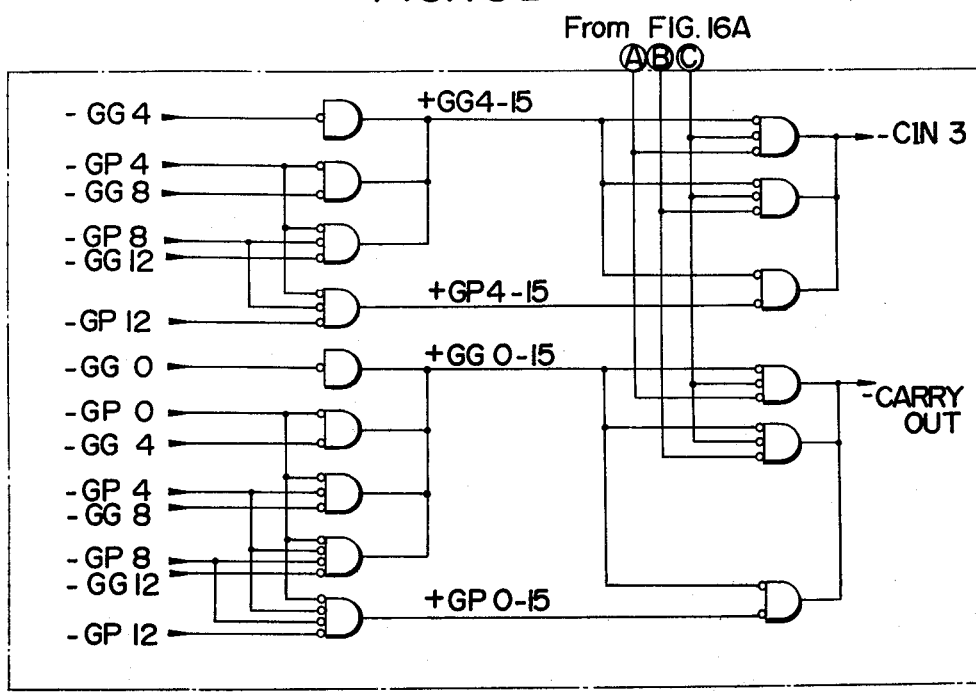

FIGS. 12 to 15 illustrate examples of circuits of the respective blocks in FIG. 11. FIG. 16 shows an example of the carry look ahead circuit for use with a high speed binary and binary coded decimal adder of 4 bytes (8 digits) using eight partial adders. Even if the width of the adder is 8-bytes (16- digits), the logic of the carry look ahead circuit can be formed with two logical stages. This can be readily inferred from FIG. 16.

Figure 17:
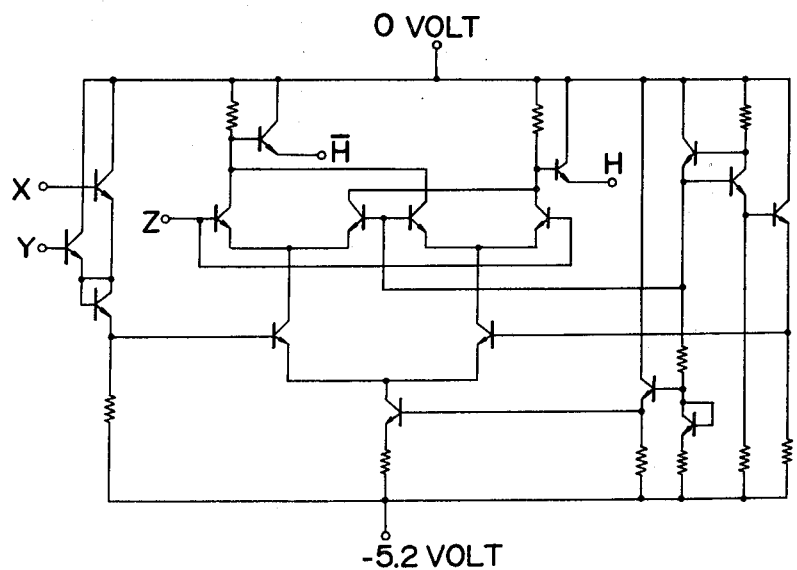
FIG. 17 is a circuit diagram illustrating an embodiment of the part surrounded by the broken line in FIG. 15.

Referring now to FIGS. 11 to 16, the number of logical stages of the adder of this invention will be discussed. The partial adder has three logical stages for generating the terms GG and GP, as seen from FIGS. 12 and 13. As evident from FIG. 16, the carry look ahead circuit has two logical stages for producing the carry input to each partial adder from the terms GG AND GP. Thus, five logical stages are required. And in the full adder part shown in FIG. 15, two logical stages are used from the carry input to the sum output. Consequently, it is considered that seven logical stages in all are needed. (In fact, it is necessary to use operators such as AND, OR and EOR seven times.) Each combination of an AND gate and an EOR gate, indicated by the lines in FIG. 15, can be formed as one logical element by the use of series gate and collector dot techniques using an emitter coupled logical element (referred to as ECL or CML) in exactly the same manner as an elementary EOR gate. Accordingly, the abovesaid combination of the AND gate and the EOR gate requires a delay time of only one state of the EOR gate. FIG. 17 shows examples of an emitter coupled circuit and logical symbols for producing the combination of AND gate and an EOR gate in the form of one logical element. The relationship between inputs X, Y, Z and outputs H, $\overline{H}$ are given as follows:

$$H = (\overline{X} \cdot \overline{Y}) \oplus Z = \overline{X} \cdot \overline{Y} \cdot \overline{Z} + (X + Y) \cdot Z$$

$$\overline{H} = \overline{X \cdot Y \oplus Z}$$

In view of the above, the adder of this invention requires seven logical stages at the most but is capable of providing a final sum at a speed corresponding to six logical stages.

It will be apparent that many modifications and variations may be effected without departing from the scope of novel concepts of this invention.

What is claimed is:

1. A high speed binary and binary coded decimal adder for selectively performing one of either the binary addition of binary coded decimal addition of two numbers and comprising a plurality of partial adders and a carry look ahead circuit;

each of said plurality of partial adders being supplied with an augend input and an addend input and a carry input;

each of said plurality of partial adders supplying at least a group generate signal and a group propagate signal to said carry look ahead circuit;

each of said plurality of partial adders comprising: a half adder element receiving said augend and addend inputs, a binary mode carry look ahead input signal generator circuit element connected to its respective half adder element, a binary coded decimal mode carry look ahead input signal generator circuit element connected to its respective half adder element, an intermediate adder element connected to its respective half adder element and both the binary and binary coded decimal mode carry look ahead input signal generator circuit elements, and a full adder element connected to the other elements comprising its respective partial adder;

each of said half adder elements generating a bit generate signal and a bit propagate signal based on each bit of the augend input and the addend input inputted to the half adder element;

each of said binary mode carry look ahead input signal generator circuit elements receiving the bit generate signal and the bit propagate signal from its respective half adder element to provide a binary mode group generate signal and a binary mode group propagate signal during the binary mode of operation of said high speed binary and binary coded decimal adder;

each of said binary coded decimal mode carry look ahead input signal generator circuit elements receiving the bit generate signal and the bit propagate signal from its respective half adder element to provide a binary coded decimal mode group generate signal and a binary coded decimal mode group propagate signal during the binary coded decimal mode operation of said high speed binary and binary coded decimal adder;

each of said intermediate adder elements receiving at least the bit generate signal, the bit propagate signal, and the binary coded decimal mode group generate signal from its respective half adder and binary coded decimal mode carry look ahead input signal generator elements to selectively perform one of either a binary addition or binary coded decimal addition of said augend and addend inputs to its respective partial adder regardless of the carry inputs thereto to produce an intermediate sum of said augend and addend inputs;

each of said full adder elements receiving and correcting the intermediate sum of its respective intermediate adder element with a carry input supplied to the least significant bit position of its respective partial adder from the carry look ahead circuit; and each of said partial adders supplying as its group generate signal to the carry look ahead circuit, a signal comprising the logical sum of its binary mode group generate signal and its binary coded decimal mode group generate signal, and supplying as its group propagate signal to the carry look ahead circuit, a signal comprising the logical sum of its binary mode group propagate signal and its binary coded decimal mode group propagate signal.

* * * * *

UNITED STATES PATENT AND TRADEMARK OFFICE
CERTIFICATE OF CORRECTION

PATENT NO. : 4,138,731
DATED : February 6, 1979
INVENTOR(S) : SHIGEMI KAMIMOTO; TOSHIO HAYASHI; KAZUYUKI SHIMIZU It is certified that error appears in the above-identified patent and that said Letters Patent are hereby corrected as shown below:

Col. 3, lines 64-66, should read

```
    0011      0101      0010      1000
+   0010      0110      1001      0001
    ────      ────      ────      ────
    0101      1011      1011      1001
```

Col. 6, line 43, "he" should be --the--.

Col. 11, line 18,""10" should be --"10"--.

Col. 12, line 30, "hardward" should be --hardware--.

Col. 13, line 10, "in" should be --In--.

Signed and Sealed this

Tenth Day of July 1979

[SEAL]

Attest:

Attesting Officer

LUTRELLE F. PARKER
*Acting Commissioner of Patents and Trademarks*